United States Patent [19]

Borostyan

[11] Patent Number: 5,307,131
[45] Date of Patent: Apr. 26, 1994

[54] COLOR IMAGE REGISTRATION SYSTEM USING VACUUM TRANSFER DRUM

[75] Inventor: Stephen Borostyan, Victor, N.Y.

[73] Assignee: Xerox Corporation, Stamford, Conn.

[21] Appl. No.: 990,851

[22] Filed: Dec. 14, 1992

[51] Int. Cl.$^5$ .............................................. G03G 21/00
[52] U.S. Cl. .................................... 355/272; 355/274; 355/312
[58] Field of Search ............... 355/271, 272, 274, 277, 355/312, 317

[56] References Cited

U.S. PATENT DOCUMENTS

| | | | |
|---|---|---|---|
| 4,403,847 | 9/1983 | Chrestensen | 355/277 |
| 4,724,458 | 2/1988 | Roy et al. | 355/274 |
| 4,899,196 | 2/1990 | Mahoney | 355/271 |
| 4,914,482 | 4/1990 | Ammenheuser et al. | 355/271 |
| 4,949,129 | 8/1990 | Fowlkes et al. | 355/274 |
| 5,081,506 | 1/1992 | Borostyan | 355/308 |
| 5,134,427 | 7/1992 | Akiyama et al. | 355/317 X |

FOREIGN PATENT DOCUMENTS

| | | | |
|---|---|---|---|
| 0369429 | 5/1990 | European Pat. Off. | 355/274 |
| 2-17078 | 9/1986 | Japan . | |
| 0117857 | 5/1988 | Japan . | |
| 1-48075 | 6/1990 | Japan | 355/274 |
| 2-11462 | 8/1990 | Japan | 355/274 |

Primary Examiner—A. T. Grimley
Assistant Examiner—Robert Beatty
Attorney, Agent, or Firm—Finnegan, Henderson, Farabow, Garrett & Dunner

[57] ABSTRACT

An apparatus for registering successive toner images to a sheet includes a rotatable photoreceptor drum having a transfer zone on its circumferential surface at which toner images are transferred to the sheet, a generally cylindrical member having a circumferential surface adjacent the photoreceptor drum at the transfer zone, the cylindrical member having a radius which is an integer multiple of the radius of the photoreceptor drum, and a belt for moving the sheet around the circumferential surface of the cylindrical member in a recirculating path. A sensor detects when a lead edge of the sheet is a first predetermined distance from the transfer zone, and a polygon raster output scanner responsive to the sensor forms a latent image on the photoreceptor drum when the sensor detects the lead edge of the sheet, at an imaging point which is a second predetermined distance from the transfer zone, the second predetermined distance not exceeding the first predetermined distance.

13 Claims, 3 Drawing Sheets

COLOR IMAGE REGISTRATION SYSTEM USING VACUUM TRANSFER DRUM

BACKGROUND OF THE INVENTION

1. Field of the Invention

This invention relates generally to color printers, and particularly relates to color image registration systems for sequential xerographic image transfer.

2. Discussion of the Related Art

The basic xerographic process includes exposing a charged photoconductive member to a light image of an original document. The irradiated areas of the photoconductive surface are discharged to record an electrostatic latent image corresponding to the original document. In black and white printing, a development system moves a developer mix of carrier granules and black toner particles into contact with the photoconductor surface. The toner particles are attracted electrostatically from the carrier granules to the latent image, forming a toner powder image thereon. The toner powder image is then transferred to a sheet of paper or other support material. This sheet of paper advances to a fuser which permanently affixes the toner powder image to the paper.

Multi-color electrophotographic printing is substantially the same as the process for black and white printing. However, rather than forming a single latent image on the photoconductive surface, successive latent images corresponding respectively to different colors are recorded. Each single color latent image is developed with the appropriately colored toner. The single color toner images are transferred to the copy sheet in superimposed registration with one another, creating a multilayered toner image on the copy sheet. The multilayered toner image is then permanently affixed to the copy sheet creating a color copy. The developer material may be a liquid material or a powder material.

In order to successively register toner images of different colors in a superimposed manner, a paper transport system was included in the basic xerographic process. The paper transport system moved the copy sheet in a recirculating path relative to the photoconductive member so that successive toner images were transferred in superimposed registration with one another.

One type of paper transport system included an electrically biased drum rotating in synchronism with the photoconductive member. The copy sheet was secured to the drum either by gripper bars or by vacuum tacking and rotated with the drum. Another, more recent type of paper transport system moved a vacuum belt in a recirculating path around a stationary vacuum chamber. The moving belt carried the copy sheet to a transfer zone where a toner image was transferred to the copy sheet by the photoconductive member. The copy sheet was then carried by the moving belt around the stationary vacuum chamber for successive toner image transfer onto the copy sheet. This type of paper transport system is disclosed in commonly assigned U.S. Pat. No. 5,081,506, which issued to the present inventor on Jan. 14, 1992, and is incorporated herein by reference.

Because the successive toner images of different colors are superimposed on each other to form a copy of a single colored image, it is necessary to control accurately the registration of images on the paper to ensure that the successive toner images are directly superimposed on each other without overlap. If done inaccurately, a blurred and shaded single or composite image will be formed.

Generally, color registration systems register the paper to the image formed on the photoconductive member. This is done by controlling the movement of the paper about the transport system so that the paper passes through the transfer zone simultaneously with the image formed on the photoconductive member. A paper to image color registration system can generally achieve an image resolution of approximately an 0.005 inch circle.

The paper generally passes through the transfer zone simultaneously with the image by rotating the transport system synchronously with and at the same speed as the photoconductive member. However, if the photoconductive member is compressed or elongated during rotation, changes in the surface velocity will occur, resulting in the photoconductive member and image rotating out of phase with the transport system.

If the paper moving around the transport system becomes out of synchronism with the image being formed on the photoconductive member, the paper is either accelerated or decelerated to the transfer zone by controlling the velocity of the transport system. This generally requires the use of servomotors to precisely control the acceleration and deceleration of the transport system. As a result, the transport system, in conjunction with the photoconductive member, becomes bulky and very expensive. This is undesirable in light of the need for smaller, less expensive color printers.

SUMMARY OF THE INVENTION

Accordingly, it is an object of the present invention to provide an apparatus for color image registration which is compact and economical.

It is another object of the present invention to provide a color image registration system which forms clear, well defined toner images of the correct color.

It is another object of the present invention to provide a color image registration apparatus which registers images to paper rather than paper to images.

It is a further object of the present invention to provide a color image registration system which can achieve a greater image resolution than a 0.005 inch circle.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the color image registration system of the present invention comprises a rotatable, generally cylindrical photoconductive member having a transfer zone on its circumferential surface at which toner images are transferred to the sheet, means for rotating the photoconductive member, a generally cylindrical member having a circumferential surface adjacent the photoconductive member at the transfer zone, the cylindrical member having a radius which is an integer multiple of the radius of the photoconductive member, means for moving the sheet around the circumferential surface of the cylindrical member in a recirculating path, means for detecting when a leading edge of the sheet is a first predetermined distance from the transfer zone, and means, responsive to the detecting means, for forming a latent image on the photoconductive member when the detecting means detects the leading edge of the sheet, at an imaging point which is a second predetermined distance from the transfer zone, the second predetermined distance not exceeding the first predetermined distance.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Figure 1:
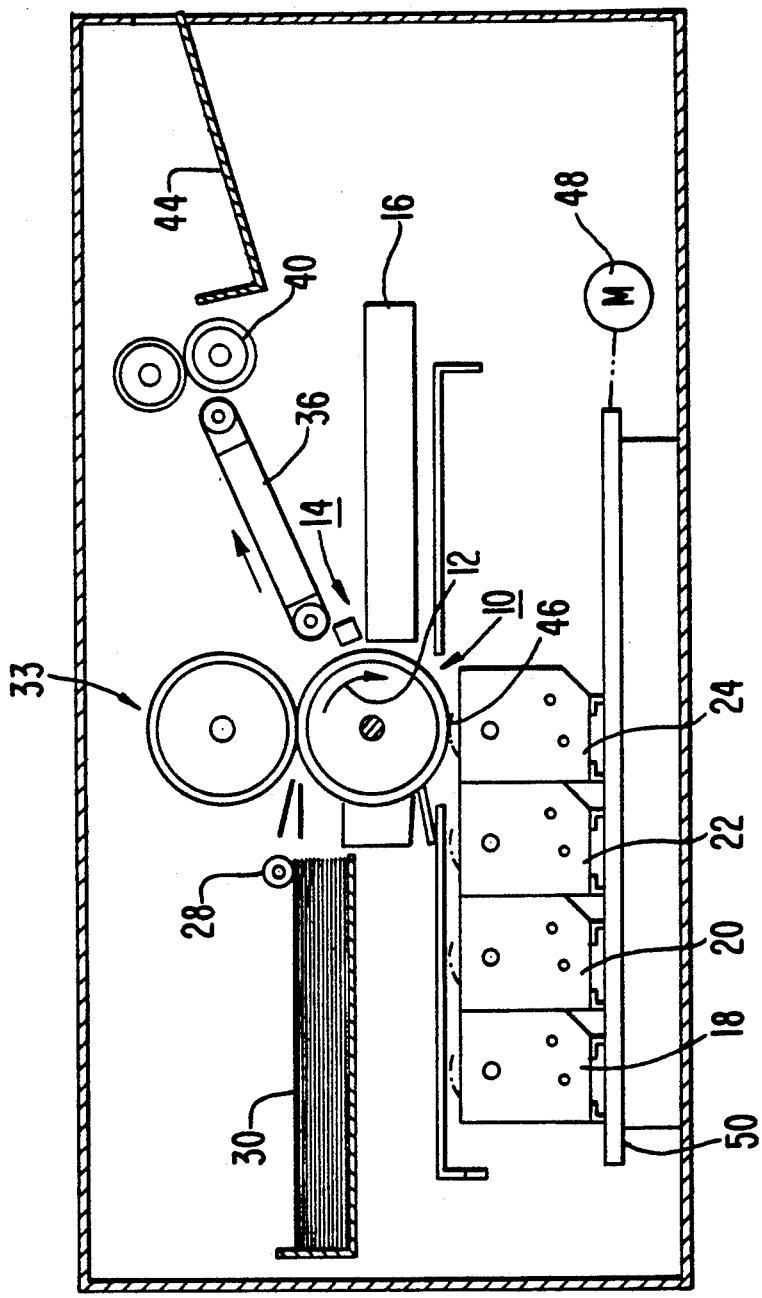
FIG. 1 is a schematic view of a color electrophotographic printing machine incorporating the features of the present invention.

Reference will now be made in detail to the present preferred embodiment of the invention, an example of which is illustrated in the accompanying drawings. Wherever possible, the same reference characters will be used throughout the drawings to refer to the same or like parts.

In accordance with the invention, a color image registration system is provided which includes a rotatable, generally cylindrical photoconductive member, means for rotating the photoconductive member, a generally cylindrical member adjacent the photoconductive member, means for moving a sheet around the circumferential surface of the cylindrical member in a recirculating path, means for detecting a lead edge of the sheet, and means, responsive to the detecting means, for forming a latent image on the photoconductive member.

Figure 2:
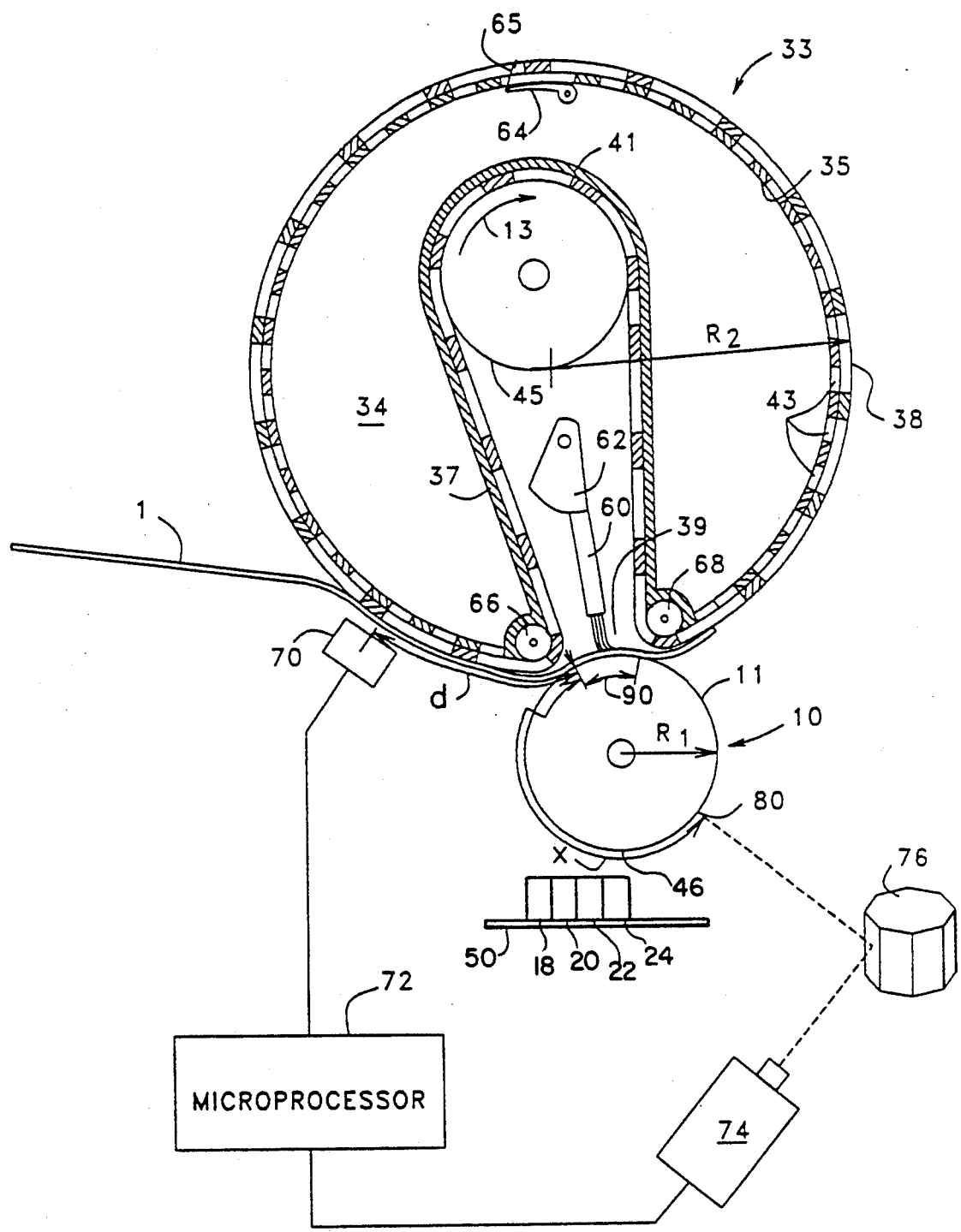
FIG. 2 is a schematic view of the color image registration system of the present invention.
Figure 3:
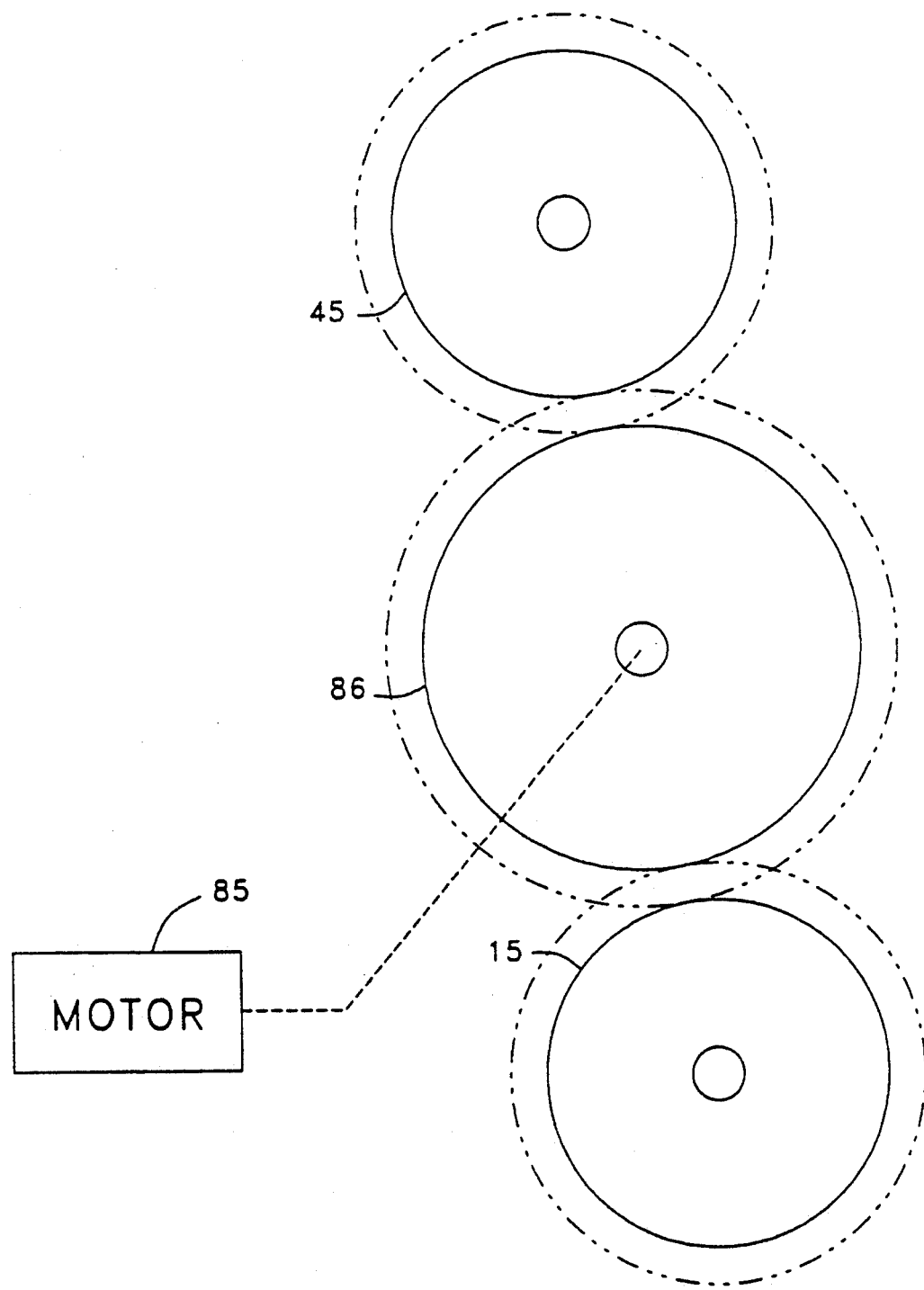
FIG. 3 is a diagram of the drive system for the color image registration system of the present invention.

In an embodiment of the invention as illustrated in FIGS. 1-3, the photoconductive member is a generally cylindrical member, such as a photoreceptor drum 10, having a radius $R_1$ and a circumferential photoconductive surface 11 on which images are formed. The photoreceptive drum 10 is rotated by a drive gear 15 in a direction of the arrow 12 to advance successive portions of the photoconductive surface 11 through various processing stations positioned about the circumference of the photoreceptor drum 10. As shown in FIG. 2, these processing stations include an imaging or scan point 80, a developing station 46, and a transfer zone 90 where the image is transferred to a sheet of paper.

The developing station 46 includes three or more individual developing units 18, 20, 22, 24 each containing a specific color to be applied to the latent image. The developing units are moved into and out of position by a carriage 50 driven by a motor 48. Typically, toner colors of cyan, magenta, yellow, and black are used. Each individual developing unit will contain one of the toner colors.

As the latent image formed on the photoconductive surface 11 passes the developing station 46, one of the individual developing units will apply a single toner color to the latent image. The manner of applying the toner to the latent image is identical to the operation disclosed in U.S. Pat. No. 5,081,506, which is incorporated herein by reference.

The generally cylindrical member and the sheet moving means provide a paper transport system of the present invention. In the illustrated embodiment, the generally cylindrical member is a fixed member designated by the reference numeral 33, and, in radial cross-section, as shown in FIG. 2, is shaped to provide cylindrical outer wall 35 and a reentrant inner wall 37 which diverges from a longitudinal slot-like opening 39 in the outer wall 35 to a partially cylindrical portion 41. A vacuum chamber 34 is defined by the space between the inner wall 37 and the outer wall 35. The outer wall 35 has a plurality of vacuum ports 43 spaced around its circumference whereas the inner wall 37 is impervious.

The sheet moving means includes a non-stretchable vacuum belt 38 which is trained about the circumference of the outer cylindrical outer wall 35, along the reentrant inner wall 37 and about a vacuum belt drive sprocket 45 which rotates in the direction shown by arrow 13. The vacuum belt 38 is perforated throughout its length to allow vacuum in the vacuum chamber 34 to pull the paper 1 against the vacuum belt 38 as it travels about the outer cylindrical surface of the outer wall 35 of the member 33. This paper transport system is thus similar to that disclosed in U.S. Pat. No. 5,081,506, which is incorporated herein by reference.

The cylindrical member has a radius $R_2$ which includes the thickness of the vacuum belt 38. The radius $R_2$ is an integer multiple of the radius $R_1$ of the photoreceptor drum 10.

The slot-like opening 39 of the cylindrical member 33 is positioned adjacent the photoreceptor drum 10 at the transfer zone 90. At the transfer zone 90, the vacuum belt 38 is moved away from the photoreceptor drum 10 so that the sheet 1 can be transferred to the surface 11 of the photoreceptor drum 10. Idler rollers 66, 68, bordering each side of the slot-like opening 39, assist in guiding the vacuum belt 38 between the outer wall 35 and the inner wall 37.

As shown in FIG. 2, a conductive fiber brush 60 is provided in the slot-like opening 39 of the cylindrical member 33. The conductive fiber brush 60 is moved into and out of engagement with the back of the sheet 1 by an activating cam 62 also provided within the slot-like opening 39. During engagement with the back of the sheet 1, the conductive fiber brush 60 applies an electrostatic charge to the sheet to attract the toner image from the photoconductive surface 11 of the photoreceptor drum 10.

A sheet separator 64 is attached to the cylindrical member 33 generally opposite the transfer zone 90. When the final color image is transferred to the sheet 1, the sheet separator 64 pivots through the perforations on the vacuum belt 38 in the direction shown by the arrow 65 to remove the sheet 1 from the vacuum belt.

The photoreceptor drum 10 and the vacuum belt 38 are synchronously rotated by a motor 85. As shown schematically in FIG. 3, the motor 85 drives a drive transmitting gear 86 which engages both the vacuum sprocket drive 45 and the drive gear 15 of the photoreceptor drum 10.

The lead edge detecting means in the illustrated embodiment includes a paper position sensor 70, preferably an optical sensor, for sensing the lead edge of the sheet 1. The sensor 70 is adjacent the outer wall 35 of the cylindrical member 33 at a predetermined distance d from the beginning of the transfer zone 90. Upon sensing the lead edge of the sheet, the sensor 70 sends a signal to a microprocessor 72 which controls the operation of the imaging means.

The imaging means in the illustrated embodiment includes a raster output scanner (ROS) 16, shown in FIG. 1, controlled by the microprocessor 72. As shown in FIG. 2, the ROS 16 includes a laser 74 used in conjunction with a rotatable polygon mirror 76. The laser 74 directs an imaging beam toward the rotating polygon mirror 76 which then reflects the imaging beam onto the charged photoconductive surface of the photoreceptor drum 10 at the imaging point 80, thus forming a latent image on the photoreceptor drum 10.

The imaging point 80 is a predetermined distance x from the transfer zone 90. The distance x is measured around the circumference of the photoreceptor drum 10 and is controlled to be less than or equal to the predetermined distance d to ensure accurate image to paper registration.

The operation of the color registration system of the present invention is described with reference to FIGS. 1 and 2. A single sheet of paper 1 from a sheet tray 30 is placed on the moving vacuum transport belt 38 from a pretransfer baffle 28 so that its lead edge covers a parallel vacuum slot on the belt 38. This assures that the paper lead edge sufficiently conforms to the curvature of the belt.

As the lead edge passes the paper position sensor 70, a timing pulse is sent to the microprocessor 72 controlling the ROS 16. The timing of this signal is compared to a reference point, establishing a nominal start of scan point for the polygon ROS. At the same time, the microprocessor 72 initiates ROS scanning to form a latent image on the surface 11 of the photoreceptor drum 10.

Prior to image formation on the photoreceptor drum 10, the surface 11 of the photoreceptor drum 10 is initially charged by a corona generating device 14, as shown in FIG. 1. The charged surface of the photoreceptor drum 10 then rotates to the imaging point 80 where the ROS 16, in response to a signal from the microprocessor 72, forms a latent image on the charged surface of the photoreceptor drum 10.

The photoreceptor drum 10 carrying the latent image then rotates to the developing station 46. A toner color corresponding to one of the developing units 18, 20, 22, 24 is attracted to the latent image to form a toner powder image on the photoreceptor drum 10.

After a toner powder image of a specific color is formed on the photoreceptor drum 10, the drum 10 is rotated to the transfer zone 90 where the paper transport system is provided adjacent the photoconductive member 10.

As the lead edge of the sheet reaches idler roller 66, it is separated from the vacuum transport belt 38 and placed on the photoconductive surface 11. The conductive fiber brush 60 is then cammed down to contact the back of the sheet 1 to effect image transfer.

The separation of the sheet from the vacuum belt is controlled so that only a small portion, approximately 10%, of the sheet 1 contacts the photoconductive surface 11 during image transfer. Since at any time after the first color image transfer more than 90% of the sheet 1 is under vacuum control, its relative position on the vacuum transport belt 38 will not change. Consequently, if the paper is placed on the belt skewed for the first color, it will remain skewed for all subsequent colors. This will result in no misregistration between colors.

As the lead edge of the sheet 1 reaches idler 68, vacuum lifting force is applied by bringing a lead edge pickup slot, which is parallel to the lead edge and synchronized with the lead edge position, in line with openings in the vacuum chamber 34. After lead edge pickup, the rest of the sheet 1 is peeled off the photoconductive surface 11 and the sheet 1 is pulled into the vacuum transport belt 38. Paper stripping of the photoconductive surface is enhanced by timing the conductive fiber brush 60 so that there will be no electrostatic field between the sheet 1 at the lead edge and the photoconductive surface.

The sheet 1 is then moved around the cylindrical member 33 to the paper position sensor 70 so that the lead edge position for the second color can be determined. The timing signal for the second color is then compared through a reference point so that the necessary adjustment to the start of scan for the ROS 16 can be made.

These steps are repeated until toner powder images corresponding to each desired color are successively superimposed on each other to form the final color image. After the last color is imaged, when the lead edge of the sheet reaches the separation point on the vacuum chamber 34, the sheet separator 64 is activated and the sheet 1 is transferred to a conveyor 36 and carried to a fuser 40 where the color image is permanently affixed to the sheet 1. The sheet 1 is then sent to an exit tray 44.

The above operation of the color image registration system of the present invention ensures accurate image to paper registration with increased image resolution over conventional paper-to-image registration systems. Having the radius $R_2$ of the cylindrical member 33 equal to an integer multiple of the radius $R_1$ of the photoreceptor drum 10 assures that variations in photoreceptor drum surface velocity due to runout does not effect color to color registration. Any image elongation or compression due to photoreceptor drum surface velocity changes will be repeated in the same manner for each color and thus will not effect color to color registration.

It will be apparent to those skilled in the art that various modifications and variations can be made in the color image registration system of the present invention and in construction of this registration system without departing from the scope or spirit of the invention.

Other embodiments of the invention will be apparent to those skilled in the art from consideration of the specification and practice of the invention disclosed herein. It is intended that the specification be considered as exemplary only, with a true scope and spirit of the invention being indicated by the following claims.

I claim:

1. Apparatus for transferring successive toner images from a rotatable photoconductive member to a sheet at a transfer zone where toner images are transferred to the sheet, comprising:
    a generally cylindrical member having a circumferential surface adjacent the photoconductive member at the transfer zone;
    means for moving the sheet around the circumferential surface of the generally cylindrical member in a recirculating path;
    means for transferring the sheet from the cylindrical member to the photoconductive member at the transfer zone, including a conductive fiber brush within an opening in the cylindrical member and means for moving the conductive fiber brush into and out of engagement with the back of the sheet;

means for detecting when a lead edge of the sheet carried by the sheet moving means if a first predetermined distance from the transfer zone; and means, responsive to the detecting means, for forming a latent image on the photoconductive member at an imaging point which is a second predetermined distance from the transfer zone when the detecting means detects the lead edge of the sheet, the second predetermined distance not exceeding the first predetermined distance.

2. The apparatus of claim 1, wherein the cylindrical member includes a vacuum chamber.

3. The apparatus of claim 2, wherein the cylindrical member has a plurality of ports around its circumferential surface.

4. The apparatus of claim 3, wherein the moving means includes a vacuum belt having a plurality of openings about its surface for allowing vacuum from the vacuum chamber to retain the sheet against the vacuum belt.

5. The apparatus of claim 1, wherein the cylindrical member includes means for removing the sheet from the circumferential surface of the cylindrical member after tone images have been transferred to the sheet.

6. The apparatus of claim 1, wherein the generally cylindrical member includes a cylindrical outer wall and a reentrant inner wall which diverges from a longitudinal slot-like opening in the outer wall to a partially cylindrical portion, the space between the inner wall and the outer wall defining a vacuum chamber.

7. The apparatus of claim 1, wherein the latent imaging means includes a polygon raster output scanner.

8. The apparatus of claim 1, wherein the detecting means includes an optical sensor.

9. The apparatus of claim 1, wherein the sheet moving means moves only a single sheet around the cylindrical member during successive image registration.

10. The apparatus of claim 1, wherein the radius of the generally cylinder member, including the thickness of the moving means, it is an integer multiple of the radius of the photoconductive member.

11. A method for tarnsferring successive toner images from a rotatable photoconductive member to a sheet at a transfer zone on the photoconductive member where toner images are transferred to the sheet, comprising the steps of:

moving the sheet past the transfer zone in a recirculating path by moving the sheet with a belt around a peripheral wall of a vacuum chamber adjacent the photoconductive member at the transfer zone, the vacuum chamber having a plurality of ports and the belt having a plurality of openings for communicating with the vacuum chamber to hold the sheet as it is moved around the peripheral wall of the vacuum chamber;

detecting when a lead edge of the sheet moving in the recirculating path is a first predetermined distance from the transfer zone; and forming a latent image on the photoconductive member at an imaging point which is a second predetermined distance from the transfer zone when the detecting means detects the lead edge of the sheet, the second predetermined distance not exceeding the first predetermined distance.

12. Apparatus for transferring successive toner images from a photoconductive body having a surface for carrying toner images to a sheet, comprising:

a vacuum chamber having a peripheral wall including a plurality of ports, the vacuum chamber being adjacent the photoconductive body at a transfer zone where a toner image is transferred to a sheet;

a belt for carrying a sheet around the peripheral wall of the vacuum chamber, the belt having a plurality of openings for receiving vacuum from the ports of the vacuum chamber;

means for detecting when a lead edge of a sheet carried by the belt is a first predetermined distance form the transfer zone; and means, responsive to the detecting means, for forming a latent image on the photoconductive body at a imaging point which is a second predetermined distance from the transfer zone when the detecting means detects the lead edge of the sheet, the second predetermined distance not exceeding the first predetermined distance.

13. Apparatus for transferring successive toner images from a rotatable photoconductive member to a sheet at a transfer zone where toner images are transferred to the sheet, comprising:

a generally cylindrical member having a circumferential surface adjacent the photoconductive member at the transfer zone, the generally cylindrical member including a cylindrical outer wall and a reentrant inner wall which diverges from a longitudinal slot-like opening in the outer wall to a partially cylindrical portion, the space between the inner wall and the outer wall defining a vacuum chamber;

means for moving a sheet around the circumferential surface of the generally cylindrical member in a recirculating path;

means for detecting when a lead edge of the sheet carried by the sheet moving means is a first predetermined distance from the transfer zone; and means, responsive to the detecting means, for forming a latent image on a photoconductive member at an imaging point which is a second predetermined distance from the transfer zone when the detecting means detects the lead edge of the sheet, the second predetermined distance not exceeding the first predetermined distance.

* * * * *